(12) United States Patent
Lin (10) Patent No.: US 11,584,292 B1
(45) Date of Patent: Feb. 21, 2023

(54) BICYCLE HANDGRIP DEVICE

(71) Applicant: VP Components Co., Ltd., Taichung (TW)

(72) Inventor: Wen-Hwa Lin, Taichung (TW)

(73) Assignee: VP COMPONENTS CO., LTD., Taichung (TW)

( * ) Notice: Subject to any disclaimer, the term of this patent is extended or adjusted under 35 U.S.C. 154(b) by 0 days.

(21) Appl. No.: 17/860,523

(22) Filed: Jul. 8, 2022

(51) Int. Cl.
*B60Q 1/24* (2006.01)
*B62J 6/24* (2020.01)
*B62K 21/26* (2006.01)

(52) U.S. Cl.
CPC ............... *B60Q 1/247* (2022.05); *B62J 6/24* (2020.02); *B62K 21/26* (2013.01)

(58) Field of Classification Search
CPC ............ B60Q 1/247; B62J 6/24; B62K 21/26
USPC ......................................................... 362/474
See application file for complete search history.

(56) References Cited

U.S. PATENT DOCUMENTS

| | | | | |
|---|---|---|---|---|
| 2,603,701 A * | 7/1952 | Schadel, Jr. | ............. | B62J 6/056 340/432 |
| 2,790,157 A * | 4/1957 | Guest | ....................... | B62J 6/056 340/432 |
| 4,623,954 A * | 11/1986 | Schott | ...................... | B62J 6/055 74/551.8 |
| 4,716,502 A * | 12/1987 | Schott | ..................... | B62K 21/26 74/551.8 |
| 5,247,431 A * | 9/1993 | Liu | .......................... | B62J 6/056 74/551.8 |
| 5,795,050 A * | 8/1998 | Carter | ...................... | B62J 6/029 362/474 |
| 7,481,560 B1 * | 1/2009 | Jaw | .......................... | B62J 6/056 340/432 |
| 2010/0053983 A1 * | 3/2010 | Liu | ........................... | B62J 6/26 362/474 |
| 2010/0067245 A1 * | 3/2010 | Fan | .......................... | B62J 6/045 362/474 |
| 2011/0051442 A1 * | 3/2011 | Chang | .................. | B62K 21/125 362/474 |
| 2016/0001837 A1 * | 1/2016 | Wan | ......................... | B62J 6/015 362/474 |
| 2022/0221145 A1 * | 7/2022 | Parker | ...................... | F21V 3/00 |

* cited by examiner

*Primary Examiner* — Laura K Tso
(74) *Attorney, Agent, or Firm* — Muncy, Geissler, Olds & Lowe, P.C.

(57) ABSTRACT

A bicycle handgrip device includes a first handgrip, a second handgrip, and a light. The first handgrip defines a first axis, with a first connection end and a second connection end disposed on two ends thereof. The first handgrip is mounted around the handlebar of a bicycle through the first connection end. The second handgrip is removably combined to the second connection end. The second handgrip defines a second axis perpendicular to the first axis and pointing at the ground surface. The light is disposed on the second handgrip for projecting light beam on the ground surface. Therefore, the light provides illumination and a warning light signal at different distances. Also, the handgrip device can be gripped in different directions, so that the user is allowed to adjust the gripping position for lowering habitual motion fatigue.

11 Claims, 11 Drawing Sheets

BICYCLE HANDGRIP DEVICE

BACKGROUND OF THE INVENTION

1. Field of the Invention

The present invention relates to bicycles, and more particularly, to a bicycle handgrip device with light.

2. Description of the Related Art

Recently, riding bicycles has become a favorite leisure activity for many people. In addition to riding the bicycle in the daytime, many people also like to ride the bicycle at night. For the consideration of riding safety, bicycle light is one of necessary additional devices.

The conventional bicycle light needs to be clamped on the head, handlebar, or handle of the bicycle through a clamp. However, the bicycle light and the clamp have a certain weight. If the user fails to install the bicycle light at the center of the bicycle head, the weight of the bicycle light and the clamp easily affects the maneuverability of the bicycle during riding. Also, the currently existing bicycle light not only affects the maneuverability during riding, but also is directly exposed to the environment. Therefore, the conventional bicycle light is usually vulnerable to wind and rain.

Besides, the currently existing bicycle light mainly provide lighting of the front for the rider to identify the road conditions at night and in dense fog. However, due to the relatively limited range of light beam projected by the bicycle light, the existing bicycle light fails to effectively notify the vehicles behind to slow down. Therefore, bicycle riders usually need to install additional lights or reflectors at the rear of the bicycle to remind the vehicles behind to slow down in time.

Furthermore, the conventional bicycle handgrip is mostly shaped in a circular tube. Therefore, the riders only hold the handgrip in a single direction and is unable to adjust the gripping angle and position according to their riding habits. Such gripping limitation easily causes discomfort during the riding process.

SUMMARY OF THE INVENTION

To improve the issues above, the present invention discloses a bicycle handgrip device which provides a lighting function and is able to be gripped in different directions, allowing the user to adjust the gripping positions according to user's demand.

For achieving the aforementioned objectives, the present invention provides a bicycle handgrip device, comprising:

a first handgrip defining a first axis, the first handgrip comprising a first connection end and a second connection end on two ends thereof along the first axis, the first handgrip being mounted around a handlebar of a bicycle through the first connection end;

a second handgrip removably disposed on the second connection end of the first handgrip, the second handgrip defining a second axis, the second axis being arranged in perpendicular to the first axis and pointing at a ground surface; and a light disposed on the second handgrip and configure to project a light beam toward the ground surface.

With such configuration, the present invention contains the light in the handgrip to prevent the weight gain on the bicycle head. Therefore, the present invention resolves the issue of the installation method of the conventional bicycle light which causes the center of gravity thereof to be unstable.

Also, the light of the present invention projects the light beam toward the ground surface, which provides illumination to both the front and the rear directions, improving the riding safety, and improving the issue of the conventional bicycle light which can only project the light beam forward and fails to warn the vehicles behind. Besides, the light is a far-distance and close-distance warning light, so as to reduce the discomfort cause by glare upon the drivers or riders behind.

Furthermore, the first handgrip is perpendicular to the second handgrip, providing different gripping directions to the user, allowing the user to adjust the gripping positions according to different habits and demands, also lowering habitual motion fatigue. Therefore, the present invention improves the issue of the conventional handgrip providing only a single gripping direction which fails to meet the habit of the user.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

The directional terms of, for example, "up", "down", "front", "rear", "left", "right", "inner", "outer", and "side" are only used herein for illustrating the relative directions shown in the drawings. Therefore, the directional terms are applied for the purpose of illustration and understanding of the present invention, instead of limiting the present invention.

Referring to FIG. 1 to FIG. 7, the present invention provides a bicycle handgrip device, comprising a first handgrip 10, a second handgrip 20, and a light 30.

Figure 1:
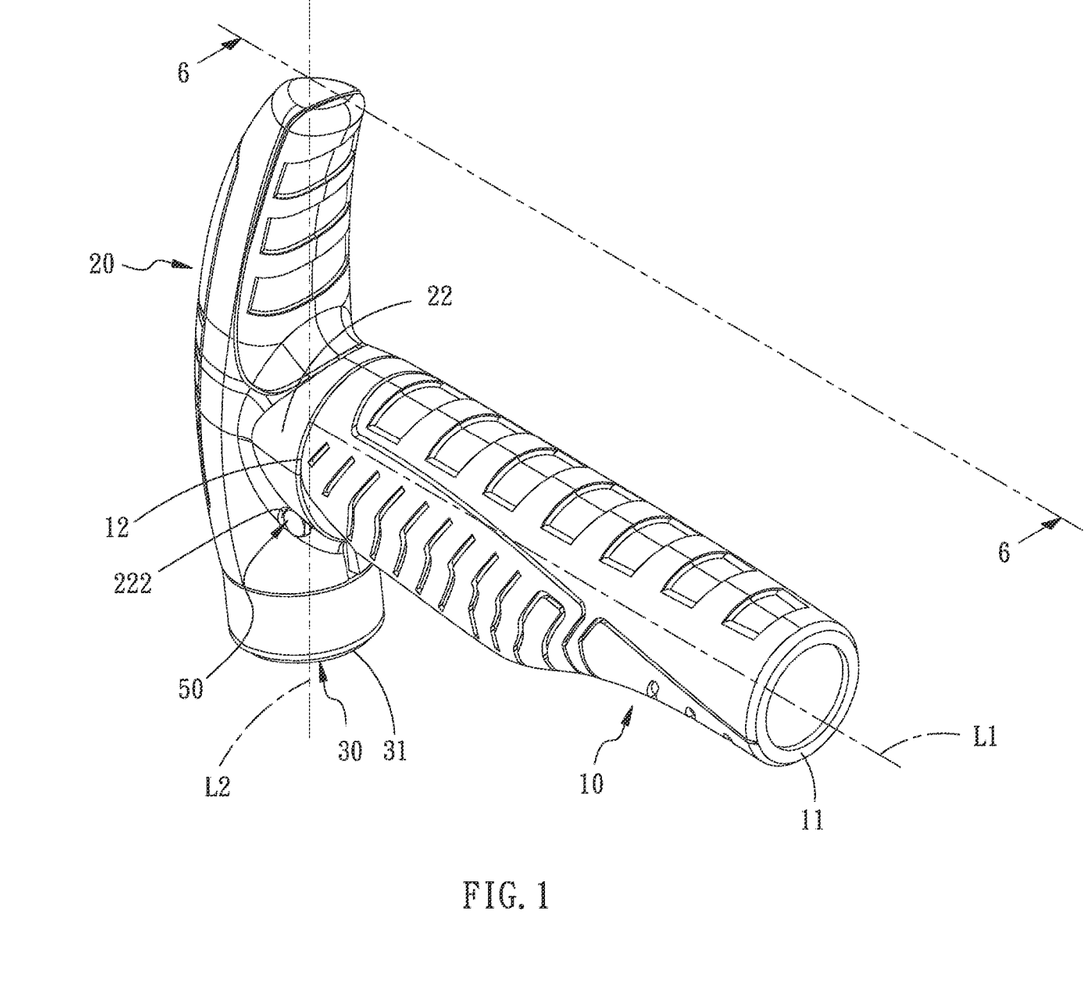
FIG. 1 is a perspective view in accordance with an embodiment of the present invention.
Figure 7:
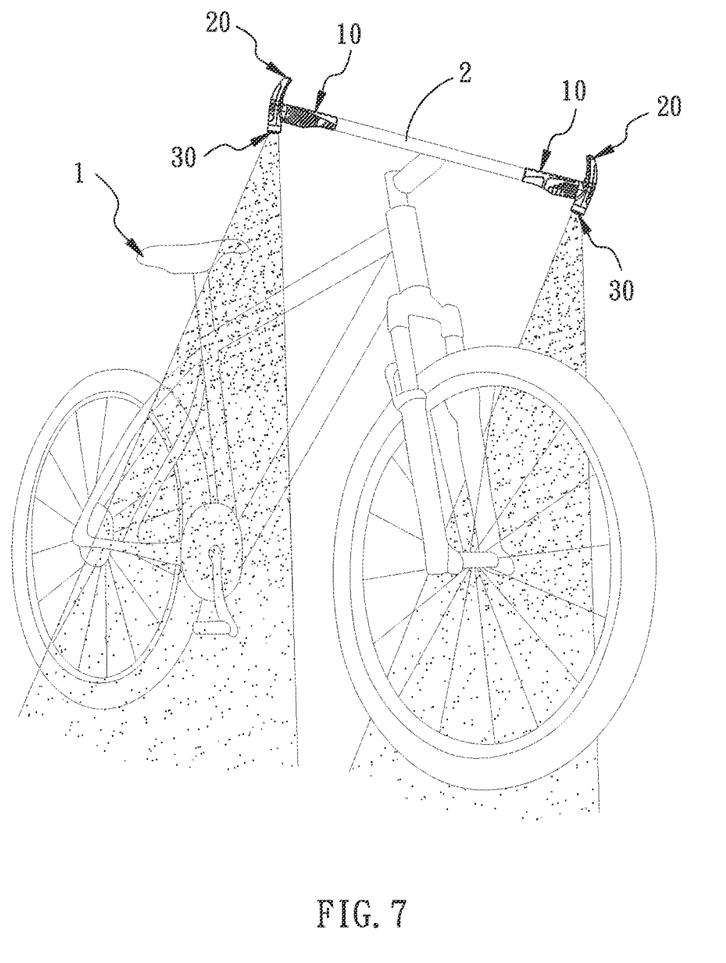
FIG. 7 is a schematic view illustrating the present invention being installed on a bicycle.

The first handgrip 10 formed in a hollow circular tube shape. The first handgrip defines a first axis L1, which is arranged in parallel to the length direction of the first handgrip 10. Therein, the first handgrip 10 comprises a first connection end 11 and a second connection end 12 on two ends thereof along the first axis L1. The first handgrip 10 is mounted around the handlebar 2 of the bicycle 1 through the first connection end 11, as shown by FIG. 1 and FIG. 7.

Figure 4:
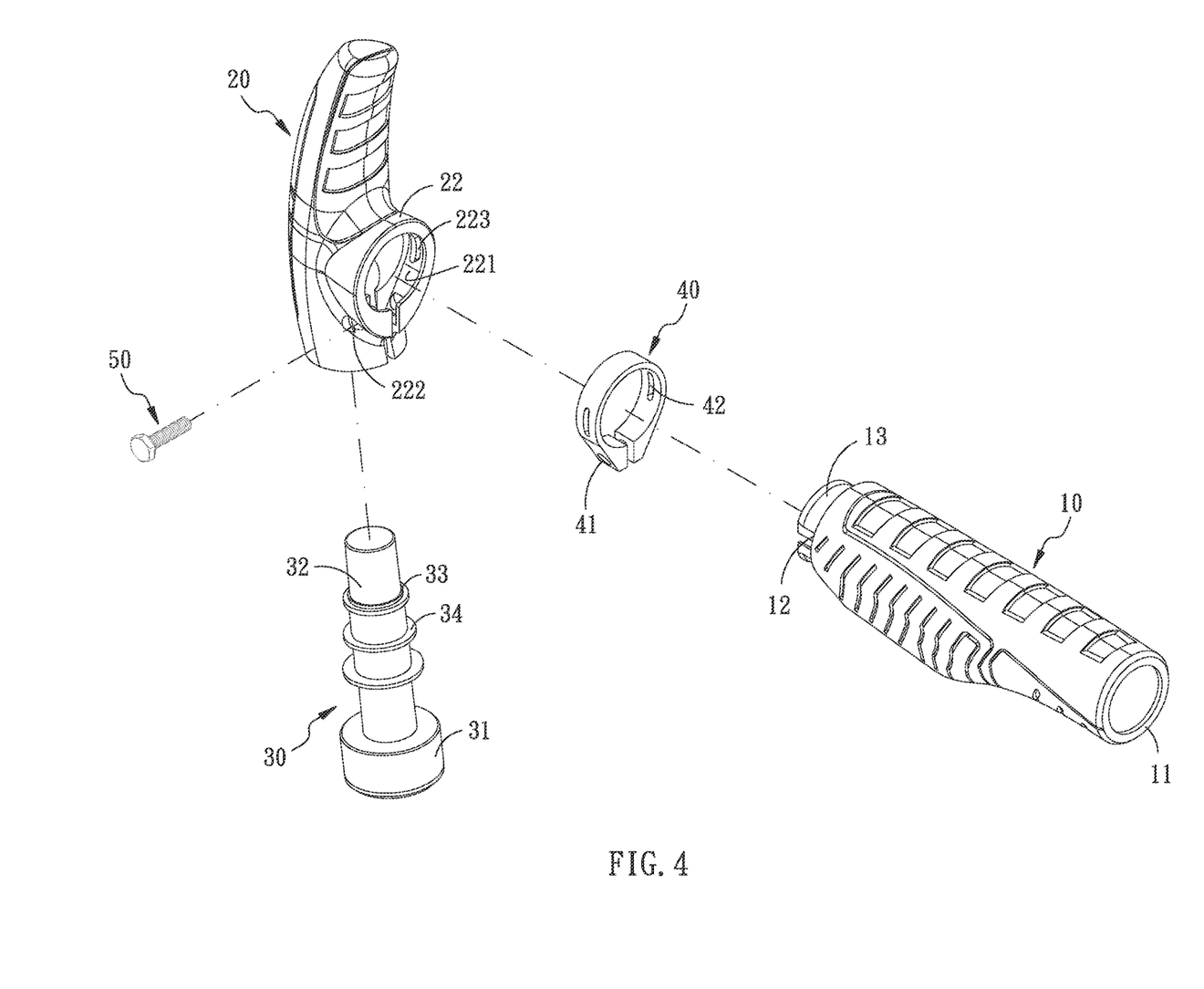
FIG. 4 is an exploded view in accordance with an embodiment of the present invention.

Also, the first handgrip 10 comprises a protrusion ring 13 convexly formed on the second connection end 12 along the first axis L1, as shown by FIG. 4. In the embodiment, the sectional face of the protrusion ring 13 is formed in a circular ring shape.

Figure 2:
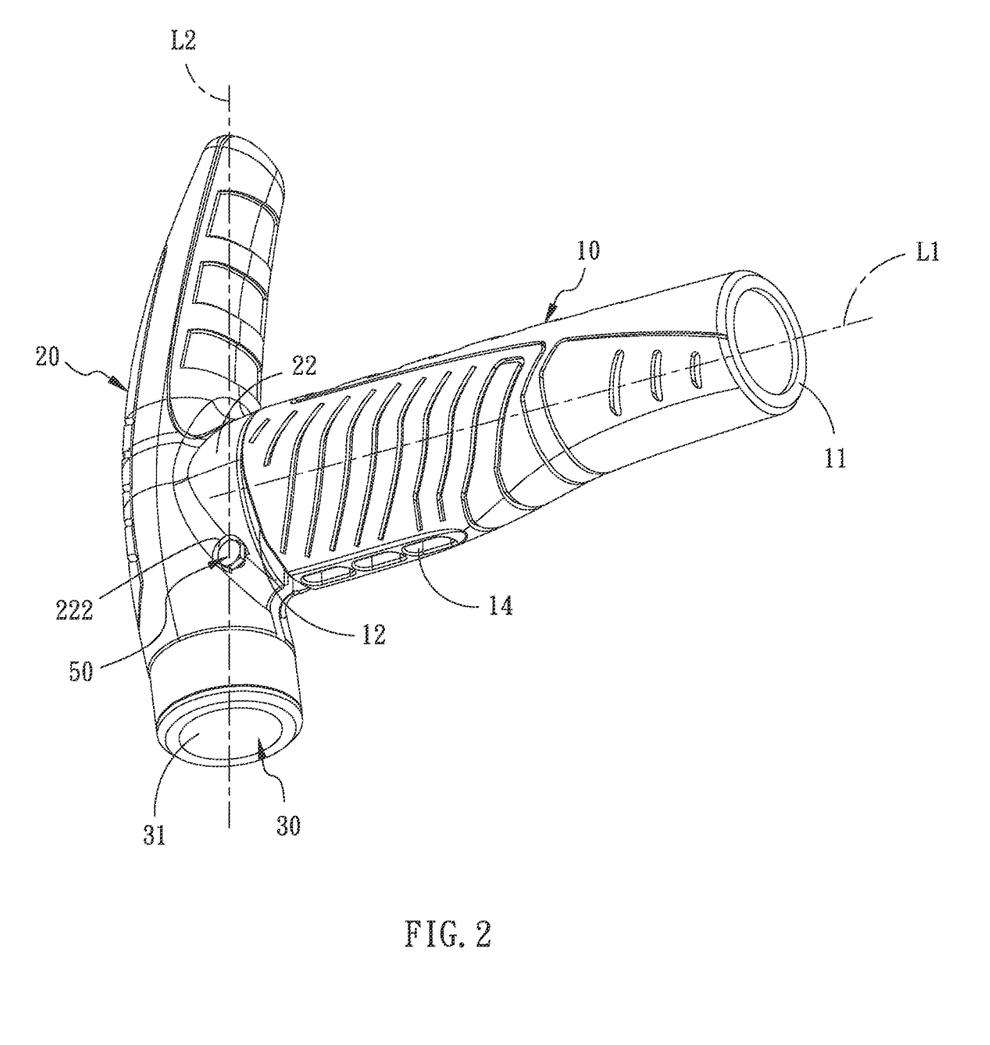
FIG. 2 is a perspective view from another point of view in accordance with an embodiment of the present invention.
Figure 3:
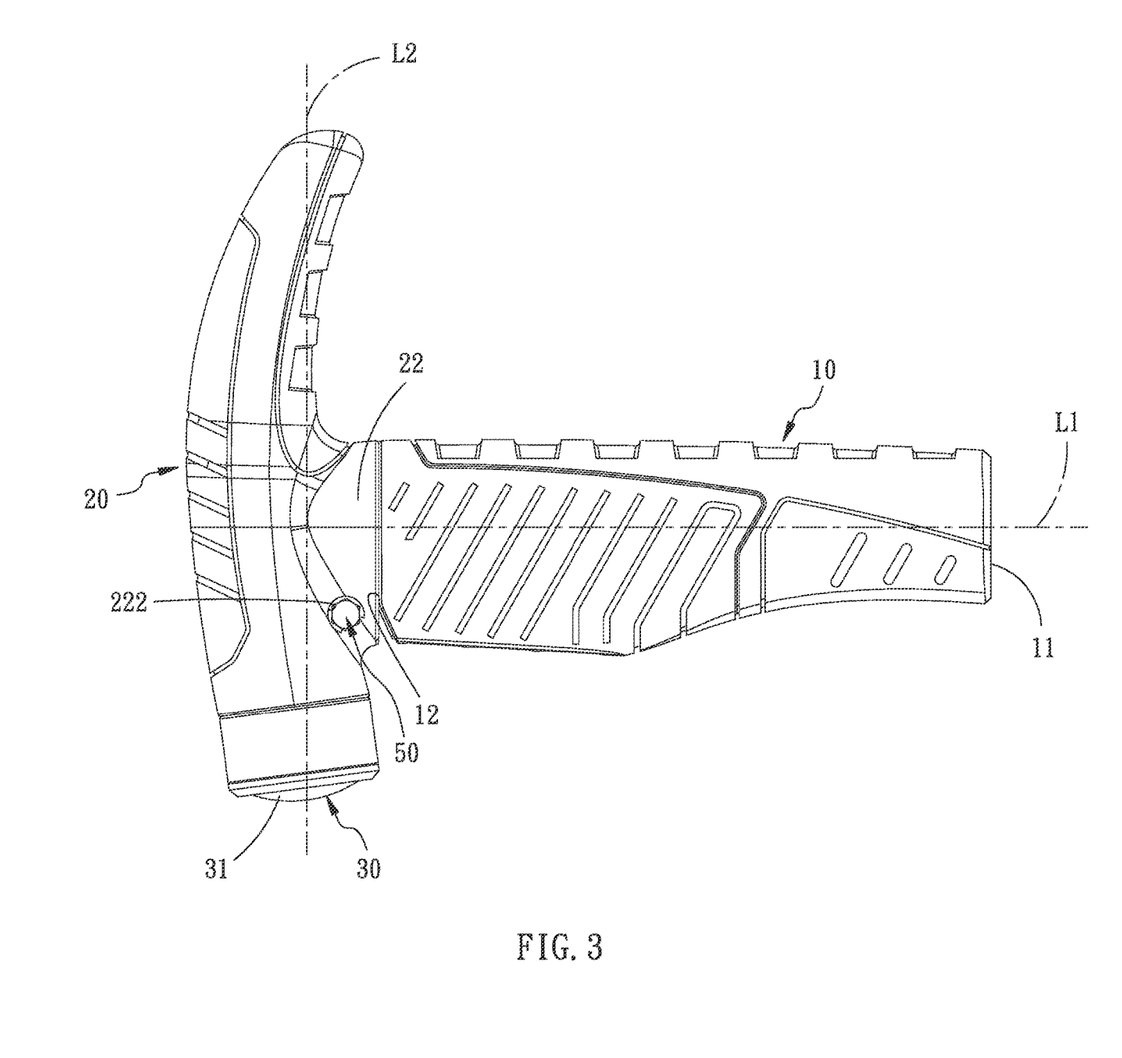
FIG. 3 is a front view in accordance with an embodiment of the present invention.

Further, the first handgrip 10 comprises a plurality of bores 14 disposed on a lateral side thereof and communicated with the inner of the first handgrip 10. In the embodiment, the bores 14 are disposed in adjacent to the second connection end 12 and arranged at intervals along the first axis L1, as shown by FIG. 2. When the user grips the first handgrip 10, the bores 14 are configured to provide an elastic compression space of the first handgrip 10, improving the gripping comfort of the user.

The second handgrip 20 is removably disposed on the second connection end 12 of the first handgrip 10. The second handgrip 20 defines a second axis L2. The second axis L2 is perpendicular to the first axis L1 and points at the ground surface, as shown by FIG. 1, FIG. 3, FIG. 6, and FIG. 7.

The second handgrip 20 comprises a containing portion 21 concavely disposed along the second axis L2. In the embodiment, the containing portion 21 is communicated with the inner of the first handgrip 10. The second handgrip 20 comprises an engagement portion 22 extending outward on one side of the second handgrip 20 in a direction perpendicular to the second axis L2. In the embodiment, the engagement portion 22 extends toward the second connection end 12 of the first handgrip 10.

Figure 5:
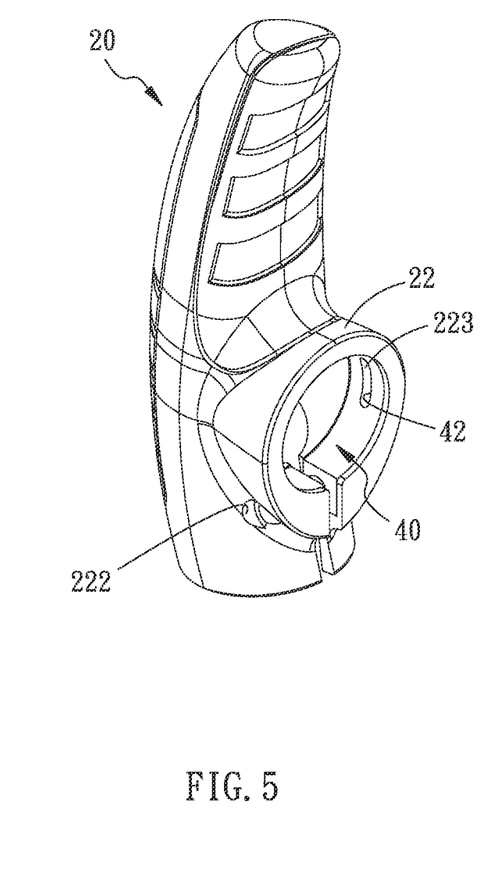
FIG. 5 is a perspective view in accordance with an embodiment of the present invention, illustrating the second handgrip combined with the binding member.

Also, the engagement portion 22 comprises a combining bore 221 and a connecting bore 222. The combining bore 221 is communicated with the containing portion 21. The connecting bore 222 is communicated with the combining bore 221. Therein, the combining bore 221 comprises a positioning portion 223 on a side wall thereof. In the embodiment, two positioning portions 223 are provided protruding on two side walls of the combining bore 221, as shown by FIG. 4 and FIG. 5.

The light 30 is disposed on the second handgrip 20 and projects a light beam toward the ground surface. In the embodiment, the light 30 is disposed in the containing portion 21 of the second handgrip 20. The light 30 comprises an illuminating portion 31 and a connecting portion 32. The illuminating portion 31 faces outward from the containing portion 21 and projects the light beam toward the ground surface. The connecting portion 32 comprises two position limiting portions 33 protruding on the outer periphery of the connecting portion 32 at intervals, with a fitting member 34 mounted around the connecting portion 32 between the two position limiting portions 33. The fitting member 34 is fitted with the containing portion 21. In the embodiment, the fitting member 34 is formed of a rubber material. The fitting member 34 is configured to tightly fit the light 30 in the containing portion 21 of the second handgrip, as shown by FIG. 6.

Notably, the illuminating portion 31 comprises a light source member and a power supply member. The power supply member provides power to the light source member, allowing the light source member to project the light. The power supply member is allowed to be a battery or connected to an external power cord. The form of the power supply member is not limited in the present invention.

A binding member 40 is connected between the second connection end 12 of the first handgrip 10 and the second handgrip 20. The binding member 40 comprises a through hole 41 and a positioning bore 42 passing therethrough. In the embodiment, the number of the positioning bore 42 correspond to the number of the positioning portion 223, so that two positioning bores 42 are provided. Therein, the binding member 40 is embedded in the combining bore 221 of the engagement portion 22. The two positioning bores 42 and the two positioning portions 223 are combined in a convex-and-concave manner, such that the binding member 40 is mounted around the outer periphery of the protrusion ring 13.

Figure 6:
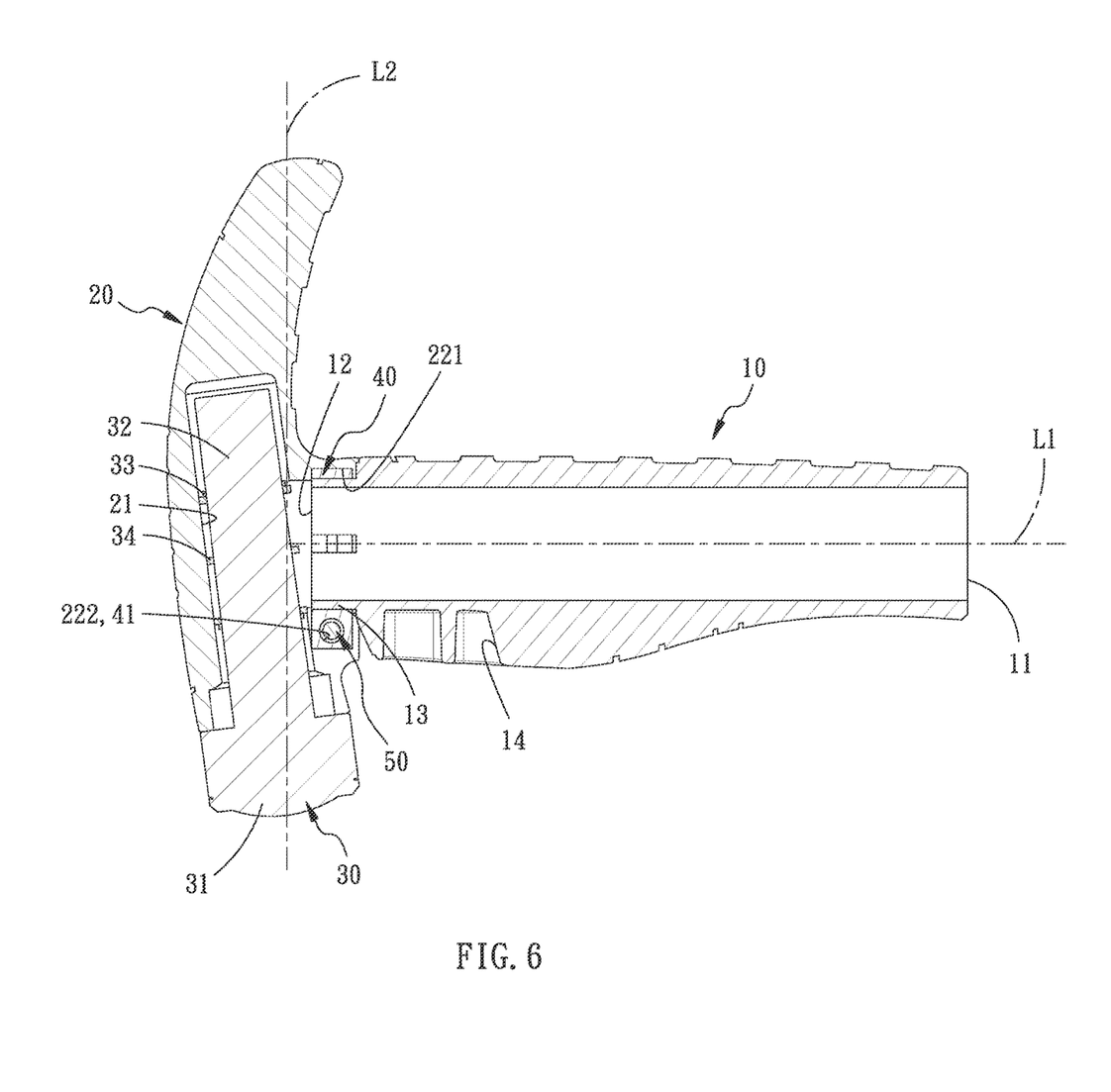
FIG. 6 is a cross-sectional view taken along line 6-6 in FIG. 1.

Further, when the binding member 40 is disposed in the combining bore 221, the through hole 41 is in positional alignment with the connecting bore 222, allowing a fastener 50 to pass therethrough, as shown by FIG. 6. In the embodiment, the binding member 40 is a clamp ring, and the screwing tightness of the fastener 50 tightly combines the binding member 40 to the protrusion ring 13 of the first handgrip 10, increasing the combination stability thereof.

With such configuration, the present invention has the light 30 being installed in the handgrip, preventing additional weight gain of the bicycle head. Therefore, in addition to providing illumination, the present invention assures the stability of the center of gravity of the head of the bicycle 1.

Also, the light 30 projects the light beam toward the ground surface below, thereby providing illumination to the front and the rear sides and also ensuring the safety of traffic on the road. Also, the light 30 is a far-distance and close-distance warning light, so as to reduce the discomfort cause by glare upon the drivers or riders behind.

In addition, the first handgrip 10 is perpendicular to the second handgrip 20, providing different gripping directions of the user, allowing the user to adjust the gripping positions according to different habits and demands, also lowering habitual motion fatigue.

Also, the bores 14 are configured to provide an elastic compression space of the first handgrip 10, improving the gripping comfort of the user.

Figure 8:
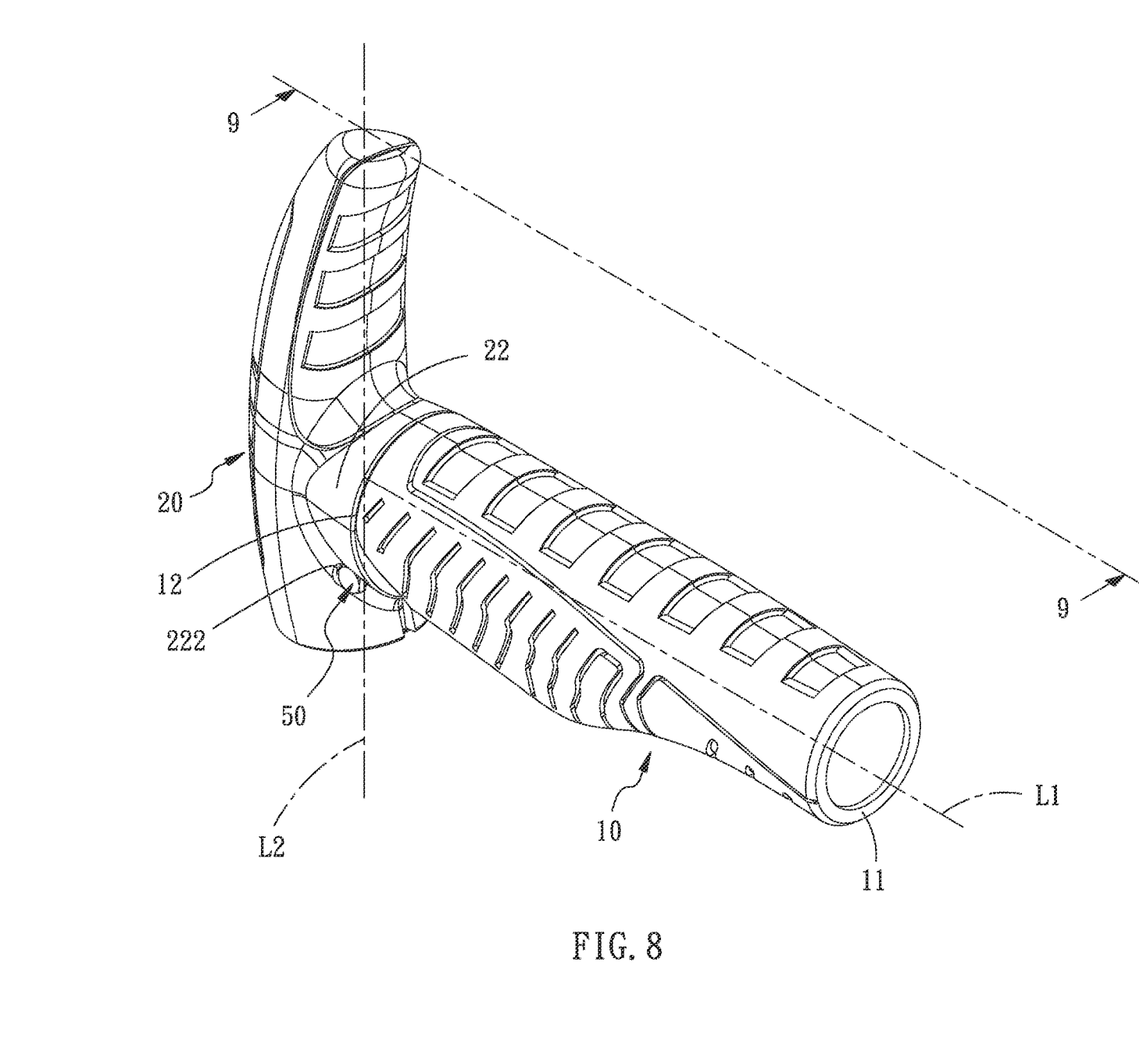
FIG. 8 is a perspective view in accordance with another embodiment of the present invention.
Figure 9:
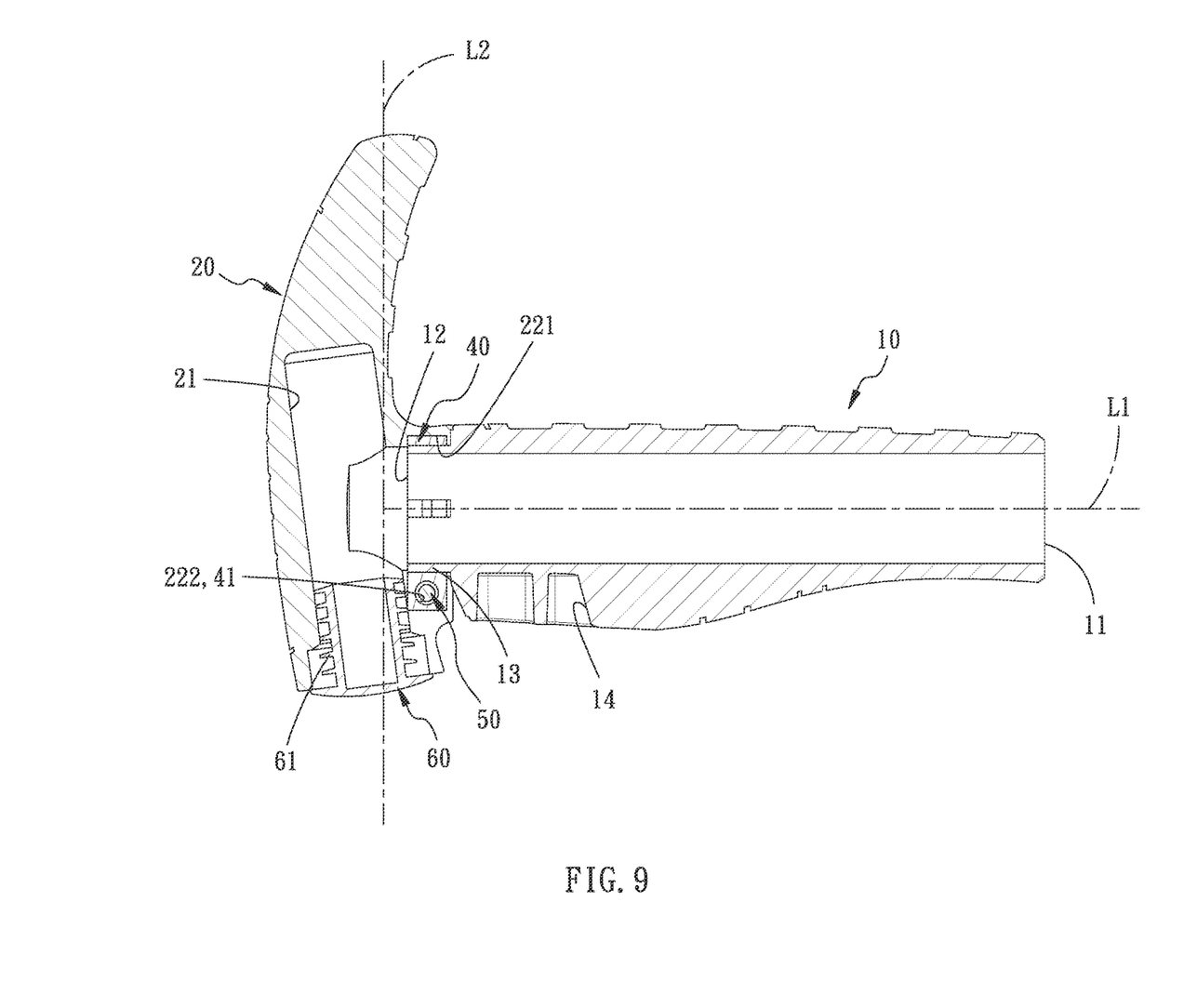
FIG. 9 is a cross-sectional view taken along line 9-9 in FIG. 8.

Referring to FIG. 8 and FIG. 9, in another embodiment of the present invention, the light 30 is able to be separated from the containing portion 21 of the second handgrip 20, and a cover 60 is able to be removably disposed in the containing portion 21 of the second handgrip 20 along the second axis L2. Therein, a plurality of tightening portions 61 are convexly disposed on the outer periphery of the cover 60, so that the cover 60 is fitted with the containing portion 21 through the tightening portions 61.

Therefore, the cover 60 seals the open end of the containing portion 21, preventing dust and dirt from entering the containing portion 21 when the light 30 is removed.

Figure 10:
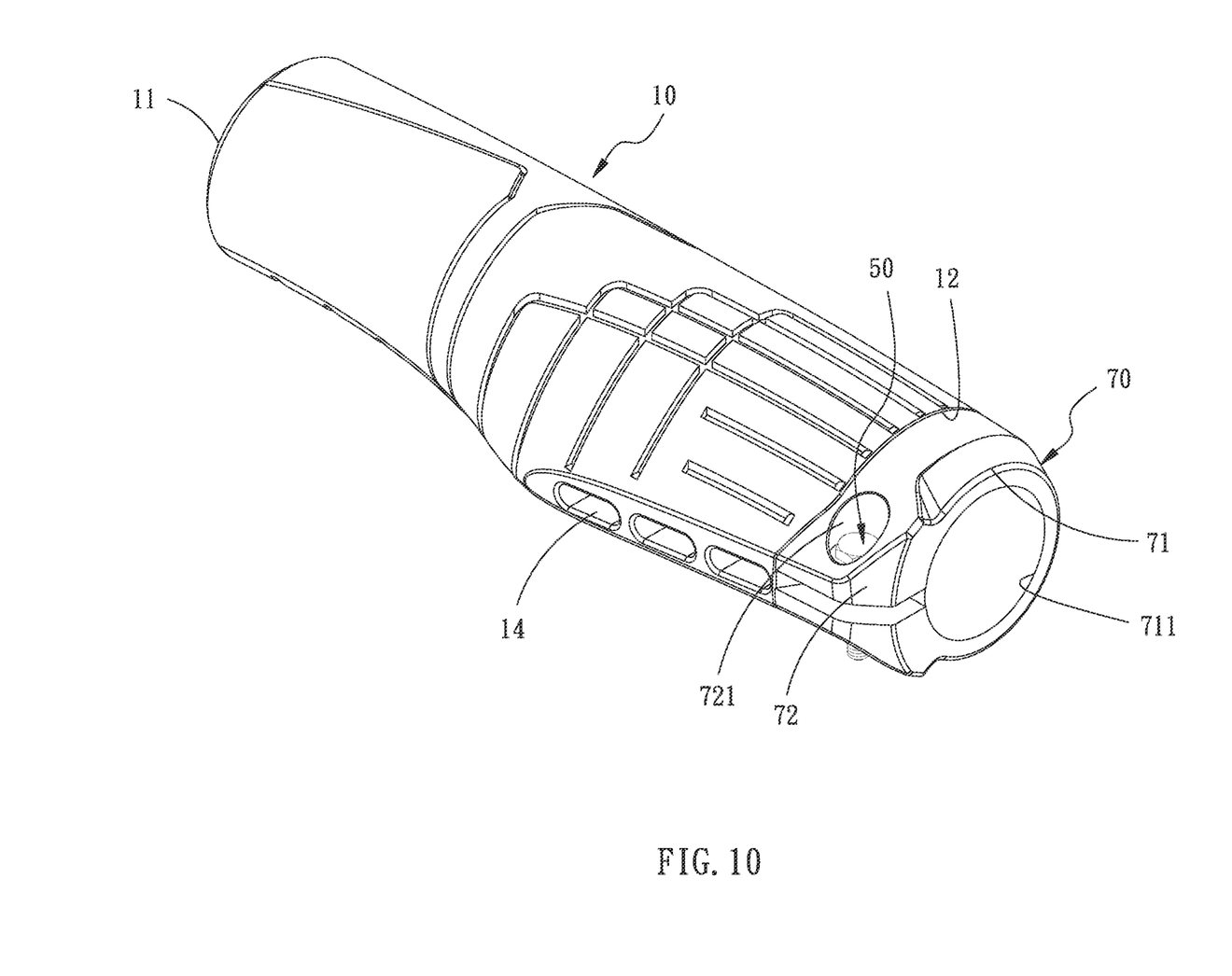
FIG. 10 is a perspective view in accordance with another embodiment of the present invention.
Figure 11:
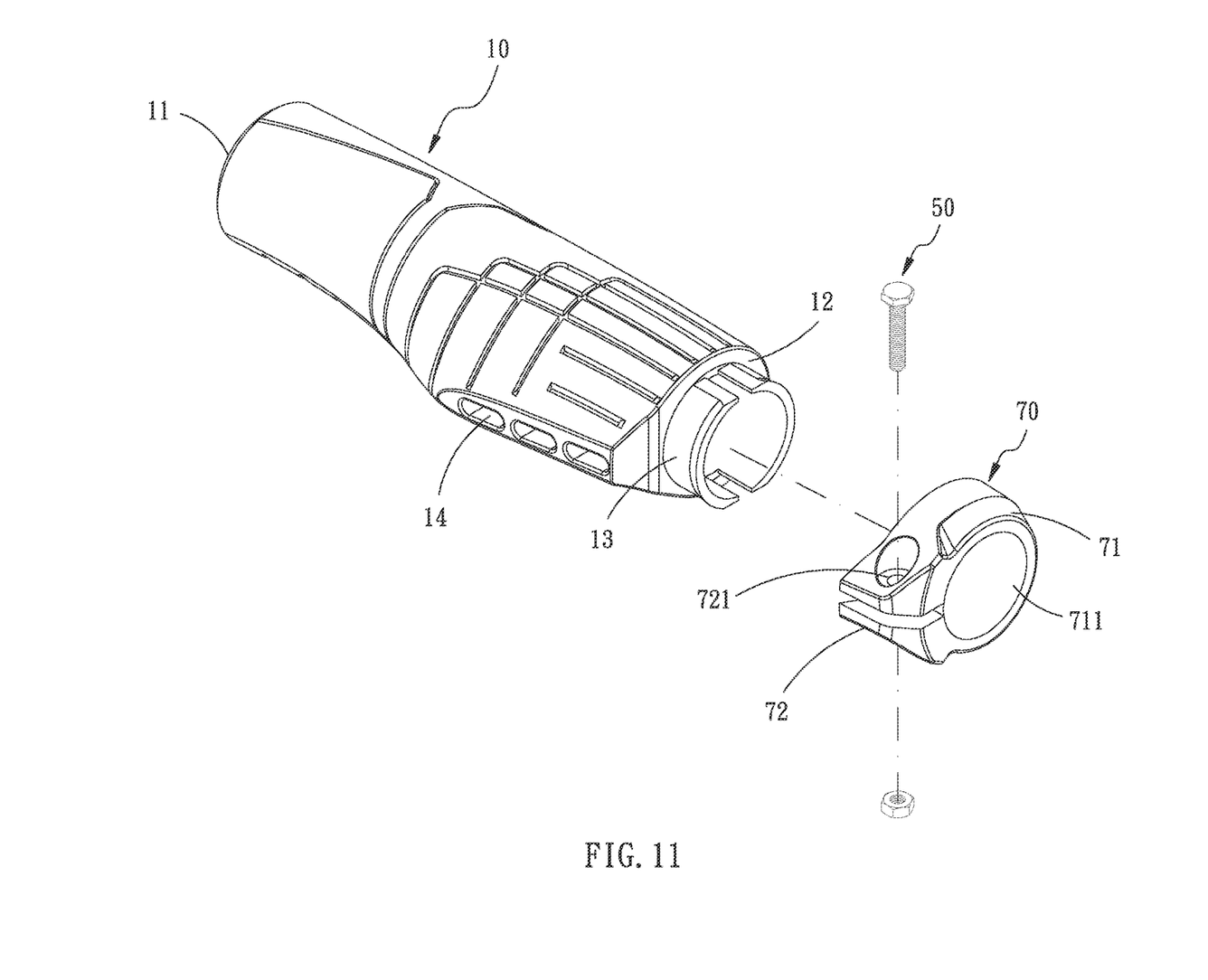
FIG. 11 is an exploded view in accordance with another embodiment of the present invention.

Referring to FIG. 10 to FIG. 11, in another embodiment of the present invention, the second handgrip 20 is separated from the first handgrip 10, and an enclosing member 70 is removably disposed on the second connection end 12 of the first handgrip 10 along the first axis L1.

Also, the enclosing member 70 comprises a ring sleeve portion 71 and a fastening portion 72 extending from one side of the ring sleeve portion 71. The ring sleeve portion 71 comprises a sleeve bore 711 passing therethrough. The sleeve bore 711 of the ring sleeve portion 71 is mounted around the protrusion ring 13, and the fastening portion 72 is accordingly located on the outer side of the protrusion ring 13. Therein, the fastening portion 72 comprises a penetration bore 721, through which the fastener 50 passes. The screwing tightness of the fastener 50 tightly combines the enclosing member 70 to protrusion ring 13 of the first handgrip 10, increasing the combination stability thereof.

Although particular embodiments of the invention have been described in detail for purposes of illustration, various modifications and enhancements may be made without departing from the scope of the invention. Accordingly, the invention is not to be limited except as by the appended claims.

What is claimed is:

1. A bicycle handgrip device, comprising:
a first handgrip defining a first axis, the first handgrip comprising a first connection end and a second connection end on two ends thereof along the first axis, the first handgrip being mounted around a handlebar of a bicycle through the first connection end;
a second handgrip removably disposed on the second connection end of the first handgrip, the second handgrip defining a second axis, the second axis being arranged in perpendicular to the first axis and pointing at a ground surface; and
a light disposed on the second handgrip and configure to project a light beam toward the ground surface.

2. The bicycle handgrip device of claim 1, wherein the second handgrip comprises a containing portion concavely disposed along the second axis; the containing portion is optionally combined with the light or a cover fitted therein.

3. The bicycle handgrip device of claim 2, wherein the light comprises an illuminating portion and a connecting portion; the illuminating portion faces outward from the containing portion; the connecting portion comprises two position limiting portions protruding on an outer periphery of the connecting portion at intervals, with a fitting member mounted around the connecting portion between the two position limiting portions; the fitting member is fitted with the containing portion.

4. The bicycle handgrip device of claim 3, further comprising a binding member connected between the second connection end of the first handgrip and the second handgrip along the first axis.

5. The bicycle handgrip device of claim 4, wherein the second handgrip comprises an engagement portion extending outward on one side of the second handgrip in a direction perpendicular to the second axis; the engagement portion comprises a combining bore which is communicated with the containing portion; the binding member is embedded in the combining bore of the engagement portion.

6. The bicycle handgrip device of claim 5, wherein the binding member comprises a positioning bore passing therethrough; the combining bore comprises a positioning portion on a side wall thereof; the positioning bore and the positioning portion are combined in a convex-and-concave manner.

7. The bicycle handgrip device of claim 6, wherein the first handgrip comprises a protrusion ring convexly formed on the second connection end along the first axis; the binding member is mounted around an outer periphery of the protrusion ring.

8. The bicycle handgrip device of claim 5, wherein the binding member comprises a through hole passing through one end thereof; the engagement portion comprises a connecting bore passing therethrough, and the connecting bore is communicated with the combining bore; when the binding member is disposed in the combining bore, the through hole is in positional alignment with the connecting bore, with a fastener passing through the through hole and the connecting bore.

9. The bicycle handgrip device of claim 1, wherein the first handgrip comprises a plurality of bores disposed on a lateral side of the first handgrip and communicated with an inner of the first handgrip; the bores are disposed in adjacent to the second connection end and arranged at intervals along the first axis.

10. The bicycle handgrip device of claim 1, further comprising an enclosing member removably disposed on the second connection end of the first handgrip along the first axis; wherein the enclosing member comprises a ring sleeve portion; the ring sleeve portion comprises a sleeve bore passing therethrough; the first handgrip comprises a protrusion ring convexly formed on the second connection end along the first axis, and the sleeve bore of the ring sleeve portion is mounted around the protrusion ring.

11. The bicycle handgrip device of claim 10, the ring sleeve portion comprises a fastening portion extending from one side of the ring sleeve portion; the fastening portion is located on an outer side of the protrusion ring; the fastening portion comprises a penetration bore, with a fastener passing through the penetration bore.

* * * * *